United States Patent [19]

McLeod et al.

[11] 4,003,686
[45] Jan. 18, 1977

[54] MOULDING PRESS

[76] Inventors: Cedric W. McLeod, 1065 Don Mills Rd., Don Mills, Ontario; Samuel J. Hughes, 198 Magnolia Ave., Scarborough, Ontario, both of Canada

[22] Filed: Mar. 18, 1976

[21] Appl. No.: 668,122

[30] Foreign Application Priority Data

Dec. 24, 1975  Canada ............................. 242559

[52] U.S. Cl. ................................ 425/373; 425/362
[51] Int. Cl.$^2$ ..................... B29H 5/28; B29H 17/00
[58] Field of Search .......... 425/233, 362, 363, 367, 425/369, 373, 374

[56] References Cited

UNITED STATES PATENTS

| | | | |
|---|---|---|---|
| 2,143,627 | 1/1939 | Knowland | 425/373 |
| 2,181,859 | 12/1939 | Baker et al. | 425/373 |
| 2,182,168 | 12/1939 | Bierer | 425/373 |
| 2,182,317 | 12/1939 | Knowland | 425/373 |
| 2,442,443 | 6/1948 | Swallow | 425/373 |
| 2,812,542 | 11/1957 | Bleher | 425/373 X |
| 2,865,047 | 12/1958 | Mason | 425/362 X |

Primary Examiner—J. Howard Flint, Jr.

[57]  ABSTRACT

A moulding press of circular type with a central moulding drum and peripherally-mounted press shoes movable radially to an inner closed position in which they press strip material to be moulded onto the surface of the drum. In their closed position, the shoes define an arcuate press surface extending part way around the drum and defining a gap exposing a portion of the drum surface in which portions of the strip material being moulded can be accommodated. This allows for moulding strip material in continuous form, and the surface of the drum has a contoured profile to impart a corresponding moulded surface on the radially inner side of the strip material in the press. The interengagement of the moulded strip and the drum retains the strip in register with the drum moulding surface when the drum is rotated to draw fresh strip material into the press and to allow moulded material to be withdrawn from the press through the said gap.

12 Claims, 7 Drawing Figures

MOULDING PRESS

BACKGROUND OF THE INVENTION

1. Field of the Invention

The present invention relates to a press for manufacturing moulded strip-form articles, such as belting, snow tracks, or tyre re-tread material, employing mouldable strip-form material such as vulcanizable rubber stock or curable plastics material in strip form.

2. Description of the Prior Art

Canadian Pat. No. 898,672 discloses a press for manufacturing endless belting, and describes a circular press having a central drum and peripherally-arranged press shoes which are movable from an outer, inoperative position to an inner, operative position in which they together define an inwardly-facing cylindrical moulding surface, the belting being moulded between the exterior circumferential surface of the drum and the said inwardly-facing cylindrical moulding surface. This patent also discusses the advantages which this type of press achieves over the previously-known in-line presses. The press described in the above-mentioned patent cannot, however, be employed for moulding continuous strip-form material. It is an object of the present invention to provide a press which has many of the advantages associated with circular presses and which is at the same time capable of moulding continuous strip-form material.

SUMMARY OF THE INVENTION

The press of the invention has a drum mounted on a stationary frame for rotation about its axis and having an exterior circumferential moulding surface on which the strip material is to be applied. The drum moulding surface is formed with a contoured moulding profile for moulding the strip material with corresponding contours when it is pressed onto the drum. A plurality of press shoes arranged around the drum on the stationary frame and are movable radially towards and away from the drum between an outer, inoperative position and an inner, closed position in which they press the strip material into conformity with the drum moulding surface. The press shoes in their inner, closed position form together an inwardly-facing arcuate press surface which extends circumferentially part way around the exterior of the drum and defines a gap between its ends exposing a portion of the drum moulding surface, in which gap portions of continuous strip material to be moulded in the press can be accommodated.

In use, the continuous strip material is fed in through the said gap, with the shoes being withdrawn to their outer inoperative position, and the shoes are then closed to mould the material against the drum. The shoes are then again withdrawn to their open position, and the drum turns, carrying the moulded portions in rotary motion in a part circle through the press, while moulded portions of the strip are parted from the drum moulding surface and withdrawn from the press through the said gap. At the same time, the rotary motion of the drum draws into the press a fresh portion of the strip to be moulded. The drum may be rotatably driven, or the pull exerted on the moulded strip to withdraw it from the press may serve to impart a rotary motion to the drum. The above-described cycle of operations is then repeated, the strip material being progressively drawn through the press, thus yielding a moulded continuous strip, without needing to sever the continuous material into lengths.

In the form of press shown in the drawings of the above-mentioned Canadian patent, it will be noted that the central drum is smooth-surfaced, to assist in the removal of the pressed and moulded endless belts therefrom. In the present invention, the drum moulding surface is formed with a contoured moulding profile so that moulded portions of corresponding contours are formed on the inner surface of the strip material during the moulding operation. This assists in the operation of the press, since, for the purposes of the present invention, the inter-engagement of the contours of the moulded product with the drum moulding surface ensures that the strip material is securely engaged with the drum surface and thus when the drum rotates fresh portions of the continuous material to be moulded are drawn into the press, while moulded material remaining in the press from the immediately-preceding cycle of operation is retained in register with the contours on the drum moulding surface, thus avoiding malformation of the product. Further, where the contoured surface of the drum extends as a continuous mould pattern around the circumference of the drum, the interengagement of the moulded material with the drum surface prevents slippage, and ensures that the strip material is moulded with a continuous pattern.

Whereas numerous forms of supports and linkages for providing that the press shoes are movable towards and away from the drum will occur to those skilled in the art, we find that it is advantageous to support the press shoes on the frame by respective pressure cylinders and pistons whereby the shoes can be extended and retracted radially towards and away from the drums.

BRIEF DESCRIPTION OF THE DRAWINGS

In the accompanying drawings, which illustrate a preferred embodiment of the invention.

DESCRIPTION OF THE PREFERRED EMBODIMENT

Figure 1:
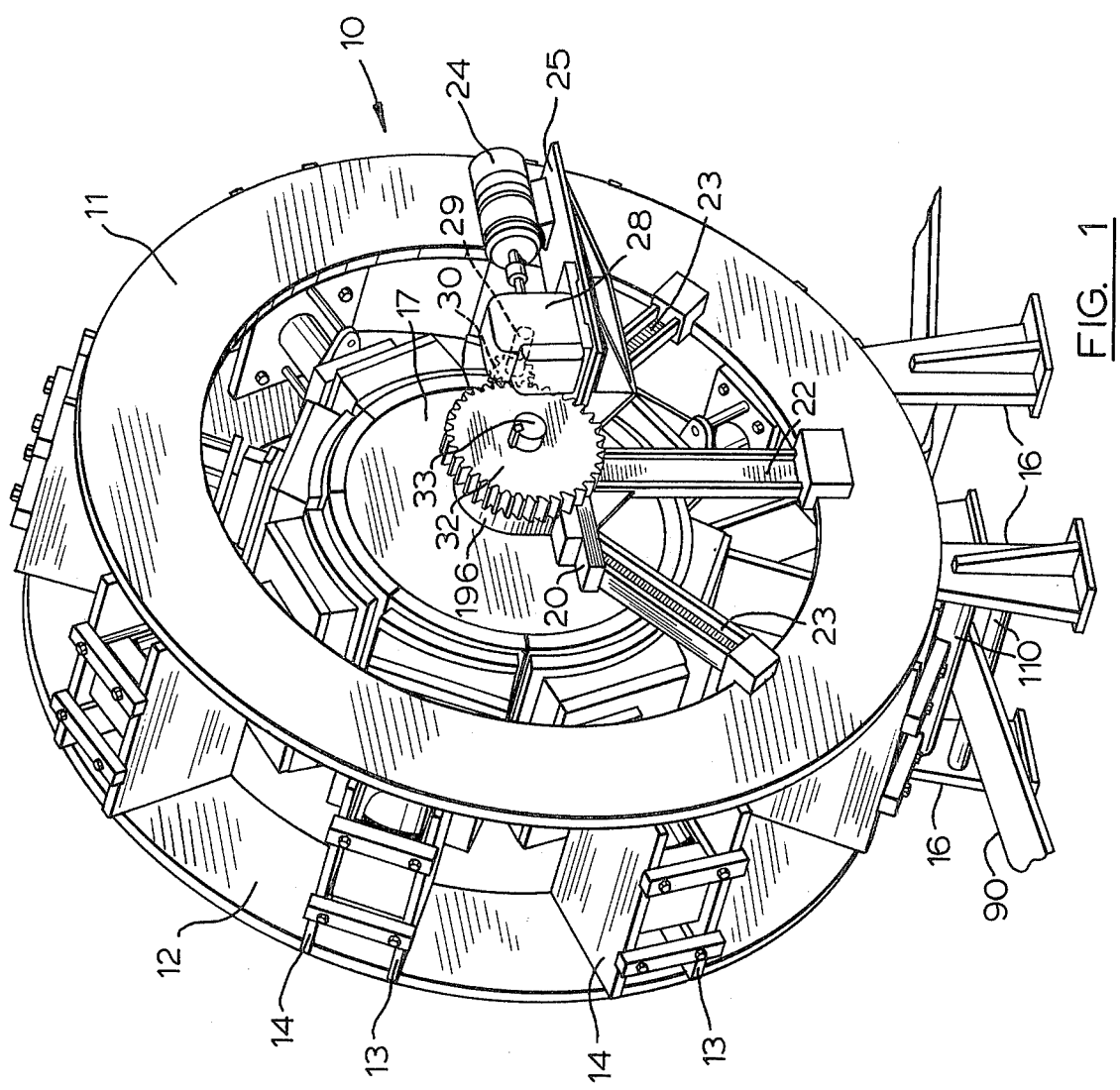
FIG. 1 shows a perspective view of a press in accordance with the invention.

Referring to the drawings, the press comprises a stationary outer frame 10 consisting of a pair of annular plates 11 and 12 connected by pairs of connector plates 13 and 14 welded to the mutually inner faces of the plates 11 and 12. The frame 10 is supported on legs 16.

A hollow drum 17 is supported centrally within the frame on trunnions 18a and b journalled in respective bearings 19a and b mounted on transverse platforms 20. At each side of the machine, the platforms 20 are supported on a set of struts, comprising a central, vertical strut 22, and two upwardly and inwardly inclining side struts 23, the struts being fixed to the adjacent annular frame plate 11 or 12 at their lower ends.

At one side, i.e. the near side as viewed in FIG. 1, there is a drive for rotating the drum comprising an electric motor 24 supported on a platform 25 connected between the platform 20 and the adjacent annular frame plate 11. The drive shaft 27 of the motor 24 passes to a gear box 28, wherein the shaft 27 is coupled through a worm and worm gear (not shown) to an output shaft 29. The shaft 29 carries a spur gear 30 meshing with a bull gear 32 keyed to a shaft 33 connected co-axially with the adjacent trunnion 18b. The worm and worm gear coupling between the motor 24 and the drum 17 has zero reverse efficiency, so that once the motor 24 is stopped, the motor 24 cannot be backdriven by a turning moment applied on the drum.

Figure 6:
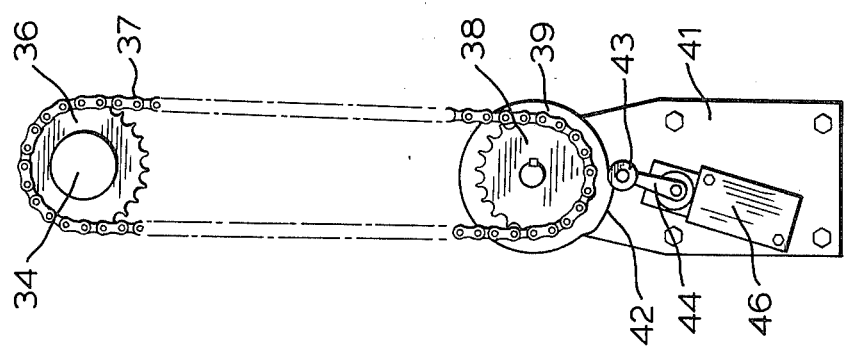
FIG. 6 shows a detail of a detector mechanism responsive to the rotation of the drum.

The trunnion 18a has at its end extending beyond the bearing 19a an extension 34, on which a sprocket 36 is connected. This sprocket 36 is used to drive a control and detector mechanism responsive to the motation of the drum and shown in detail in FIG. 6. As the drum 17 turns, the sprocket 36 drives an endless chain 37, which engages a lower sprocket 38. The sprocket 38 is coupled to a cam disk 39 rotatably mounted on a plate 41 supported on the adjacent strut 22. The cam disk 39 includes a radial protrusion 42, and cooperates with a cam follower roller 43 on a spring-loaded actuating arm 44 of a microswitch 46. The microswitch 46 is connected in appropriate electrical circuitry which serves to stop the drive motor 24 when the microswitch 46 is actuated through the protrusion 42 contacting and displacing the cam follower 43. The drive ratio between the upper and lower sprockets 36 and 38 as determined by the number of teeth on the respective sprockets, is such that the cam disk 39 makes one complete turn when the upper sprocket 36 turns through a predetermined angle less than 360°. Thus, once the drum has turned through a predetermined angle, the motor 24 will be stopped and the drum retained in a fixed position. A manual override switch is connected in the electrical circuitry, for re-starting the motor once it has been de-energized following actuation of the microswitch 46, so that it runs until it is once again de-energized on actuation of the microswitch 46 following a further predetermined rotation of the drum 17. The arrangement of the electrical circuitry required in association with the microswitch 46 and motor 24 to give the above-described control over the rotation of the drum will be well understood by those skilled in the electrical arts, and forms no part of the present invention.

The trunnions 18a and 18b are each formed with respective axial passageways 47a and 47b, the passageway 47b serving as an inlet for steam for heating the drum 17. A right-angled outlet pipe 48, for outlet of condensate from the drum, extends through the passageway 47a, with the open end 49 of the pipe positioned at a short distance from the interior wall of the drum 17. The outer end of the outlet pipe 28 extends beyond the bearing 19a and is connected through an adjustable rotary joint 51 and a connection head 52 to an exterior outlet pipe 53 which is fixed relative to the machine frame. The joint 51 between the outlet pipe 48 and the head 52 normally serves to retain the pipe 48 in fixed position, but allows for adjustment of the pipe 48 by turning it about the horizontal axis to any desired inclination to the vertical, thus permitting adjustment of the spacing between the open end 49 of the pipe and interior wall of the drum. In this way, the depth of the pool of condensate which collects inside the drum can be varied. A low-friction material bushing 54 for example of TEFLON (Trade Mark) is located within the passageway 47a in the trunnion 18a and forms a steam-tight seal between the exterior of the pipe 48 and the trunnion 18a. The low friction bushing 54 allows for rotational slippage between the pipe 48 and the trunnion 18a when the drum is rotated with the pipe 48 being held stationary.

A contoured moulding surface is formed on the exterior circumferential surface of the drum 17. This moulding surface extends continuously around the circumference of the drum, and is constituted by a plurality of abutting segmental arcuate mould plates 56 which are secured to the drum, for example by bolts. The mould plates 56 are of channel section, with two upstanding sidewalls 57 and 58 defining between them a shallow channel of depth and width suitable for receiving the continuous strip material to be pressed. The bottom of the channel is formed with a series of indentations and/or protrusions forming a profiled negative of the contoured pattern with which the strip material is to be impressed. In the example shown in the drawings, a pattern of protrusions 59 form a profile appropriate for imparting an automobile tyre tread to the continuous strip material.

A plurality of press shoes 61 to 68, in this example eight in number, are arranged around the circumferential moulding surface of the drum 17. Each press shoe is connected on a piston rod 69 of a respective pressure cylinder 71, the pressure cylinders 71 being secured to the outer frame 10 in mutually circumferentially spaced arrangement, and being aligned radially with respect to the drum 17, so that on actuation of the pressure cylinder 71, the press shoes 61 to 68 can be extended or retracted radially towards and away from the drum.

Figure 3:
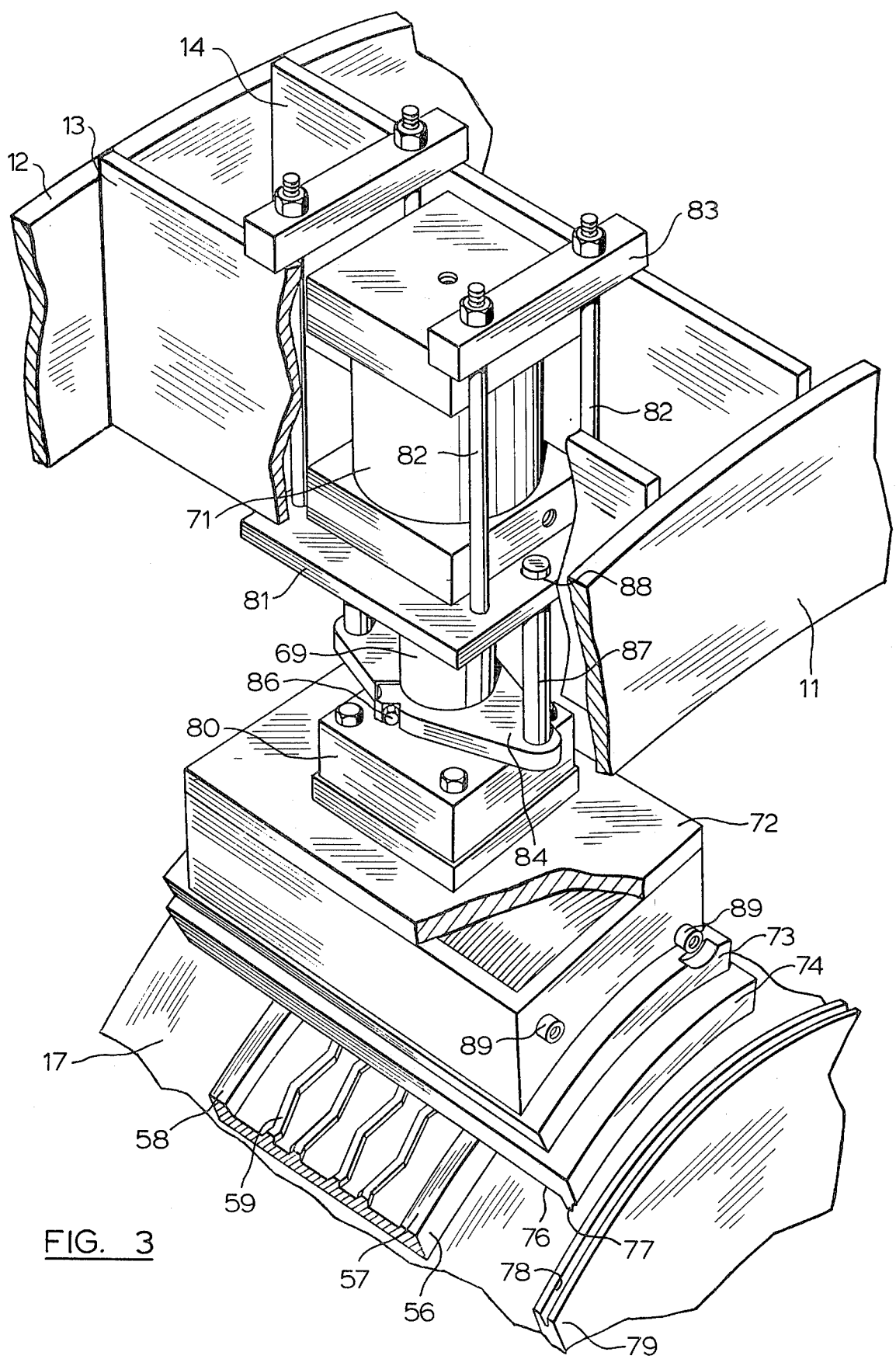
FIG. 3 shows a perspective, partly fragmentary view of a press shoe.
Figure 4:
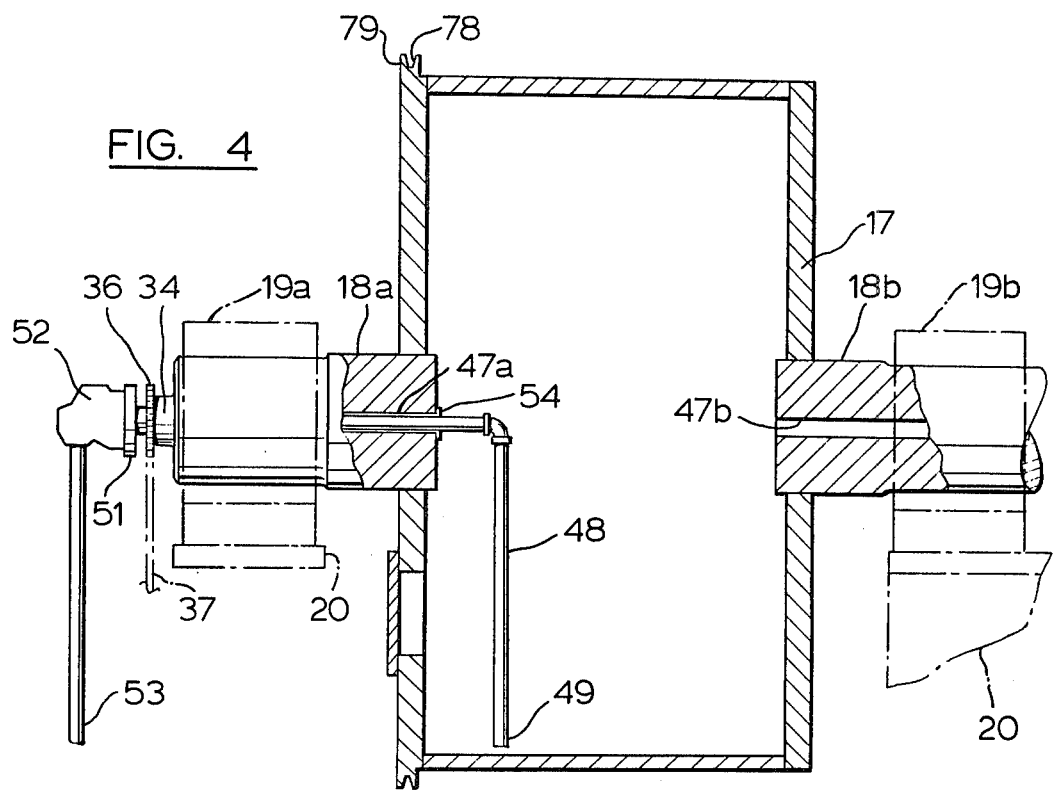
FIG. 4 shows a vertical section of the drum taken on the axis thereof.

Each of the press shoes 61 to 68 is generally similar in structure, and is mounted to the outer frame 10 in a similar fashion. Details of the structure and of the mounting of a press shoe are shown in FIG. 3. The press shoe comprises a steam jacket 72, having as its radially inner wall an arcuate plate 73, on the radially inner side of which is connected, as by bolting, an arcuate press plate 74 whose radially inner face 76 is curved in conformity with a radially outer top faces of the sidewalls 57 and 58 of the mould plates 56, so that in the extended position of the press shoe, the press plate 74 will seat snugly on the sidewalls 57 and 58 of the mould plate 56. Along one side edge, the press plate 74 carries a rib 77, which, in the extended position of the press shoe, enters a cooperating groove 78 formed in circumferential rib portion 79 on the adjacent edge of the drum 17, so that as the press shoe is urged towards the drum, the engagement of the rib 77 in the groove 78 serves to hold the press shoe in mating alignment with the mould surface of the drum.

On the outer side of the steam jacket 72, a coupling 80 connects the shoe with the piston rod 69 of the pressure cylinder 71. The pressure cylinder 71 is of standard type and includes an integral rectangular face plate 81. Tie-bolts 82 pass through the face plate 81, and retain in compression at their outer ends cross piece 83 which bridge the outer edges of the connector plates 13 and 14, thus clamping the cylinder 71 to the connector plates 13 and 14. The press shoe is restrained against swivelling about the axis of the piston rod 69 by a split retainer plate 84 tightened into clamping engagement around the piston rod 69 by a set screw 86, the retainer plate 84 carrying a pair of dowels 87, which slide in respective openings 88 in the face plate 81.

Figure 2:
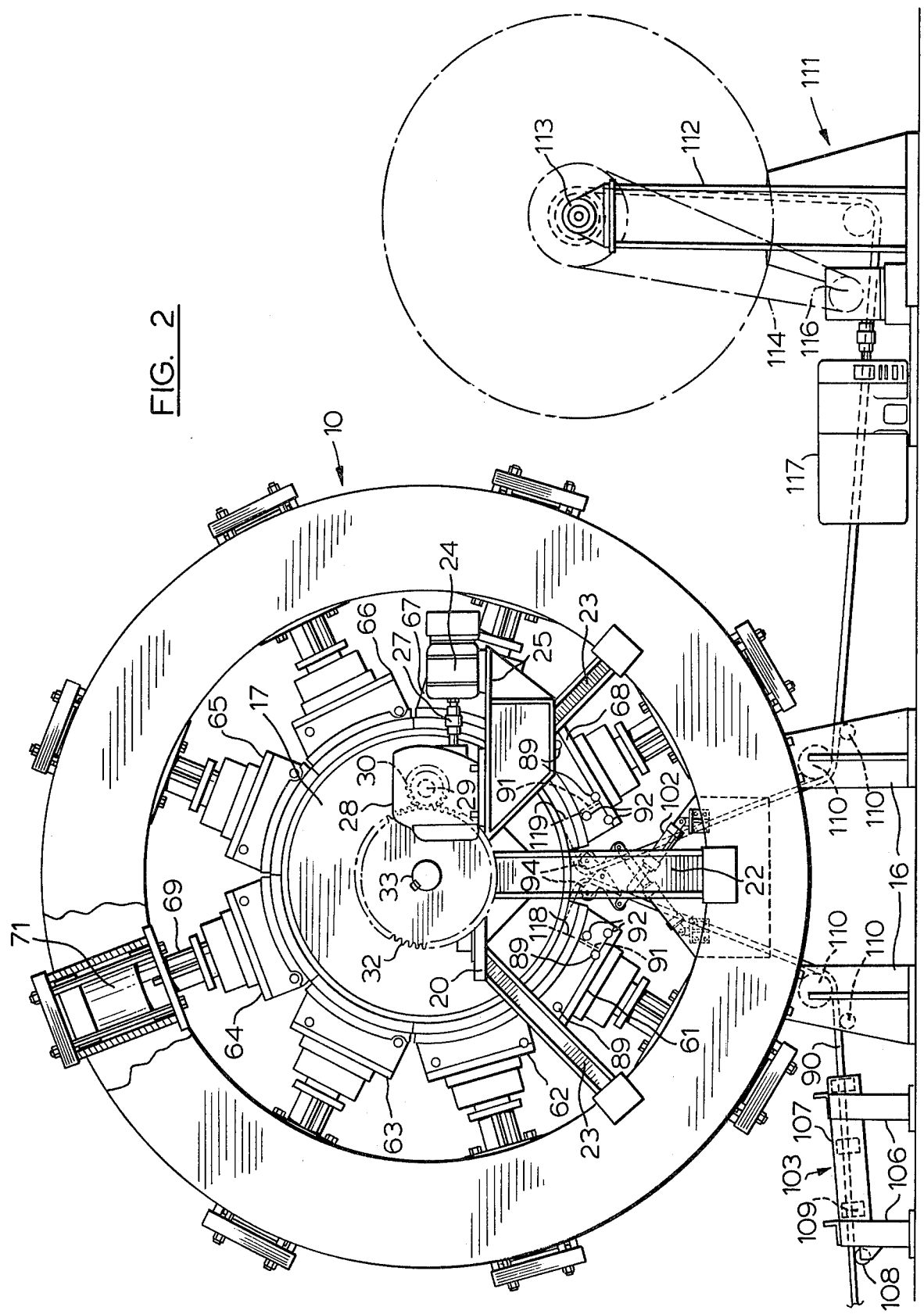
FIG. 2 shows an end elevational view of the press, partly in section, and showing the take-up reel for the moulded product.

The press shoes 61 to 68 are distributed in spaced arrangement on the frame 10 in such a manner that when they are moved from the radially outer, retracted position, as shown in FIG. 3, to the radially inner, extended position shown in FIGS. 1 and 2, their press plates 74 meet together at circumferentially adjacent edges to define an inwardly facing arcuate press surface which extends in a part cylinder through about 340° around the circumference of the drum 17. In operation, this press surface presses the continuous strip material into moulding contact with the mould plates 56. The press shoes 61 and 68 at the lower part of the press are spaced apart through a somewhat greater annular distance than the others, so as to define, when the shoes are closed, a gap in the press surface at the lower part of the press exposing a portion of the drum moulding surface which, in this example, subtends an angle of about 20° at the axis of the drum. As will be described in greater detail later, strip material 90 to be pressed is fed into the press through this gap, and is withdrawn from the press through the gap after moulding.

Each of the press shoes 61 to 68 is provided with steam inlet and outlet connections 89 for passing steam through the steam jackets 72 so as to heat the press plates 74. The two lower press shoes 61 and 68 which define between them the above mentioned gap each have a partition 91 within their steam jackets 72, dividing each of these into two separate chambers, the positions of the partitions being indicated in broken lines in FIG. 2. An auxiliary set of inlet and outlet connections 92 is provided to each of the two smaller chambers defined by the partitions 91 which extend adjacent the end surfaces of the press shoes 61 and 68 bordering the above mentioned gap.

Figure 5A:
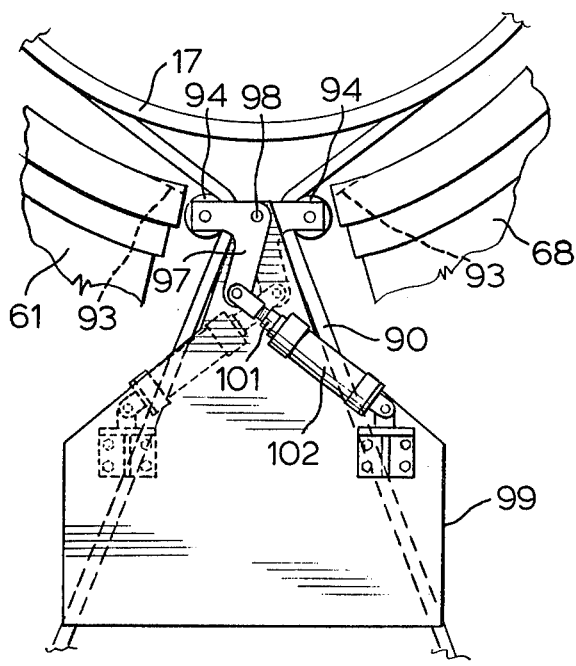
FIG. 5a and b illustrate the action of support rolls for the continuous strip material.
Figure 5B:
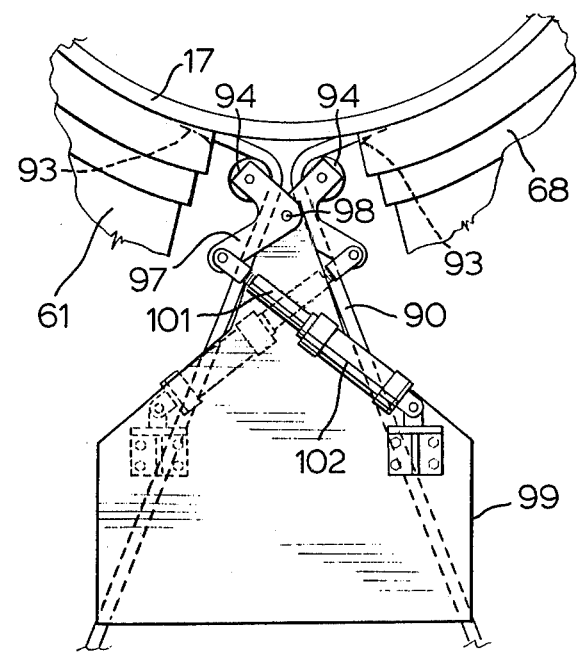

The inner sides of the press plates 74 of the press shoes 61 and 68 at either side of the gap are beveled, as indicated in broken lines at 93 in FIGS. 5a and 5b, and the terminal edges of the beveled portions are also preferably smoothly rounded, so as to avoid overstressing the continuous strip material 90 when the press shoes contact the material as they are urged inwardly to the closed position. Each roller 94 has at each end a supporting bell crank lever 97. The adjacent pairs of levers 97 are coupled together at a common pivot point 98 on a plate 99 connected on the press frame 10. The piston rods 101 of tiltable pressure cylinders 102, also mounted on the plate 99, connect with the lower ends of the bell crank levers 97, whereby the rollers 94 can be rocked from a lower position, as shown in FIG. 5a, to a raised position, as shown in FIG. 5b. The rollers 94 normally are maintained in the raised position, in which they serve to hold the strip material 90 out of contact with the edge portions of the lower shoes 61 and 68 until the shoes are nearly completely closed onto the drum 17. They need only be moved to the lowered position during the initial procedure for threading the continuous material 90 into the press, when somewhat more ready access to the moulding surface of the drum is desired. Further, in the normal, raised position shown in FIG. 5b, the rollers 94 support the continuous strip material close to the moulding surface of the drum, so that it enters and leaves the moulding zone defined between the press shoes and the drum in a gentle curve.

A supply reel (not shown) of the continuous strip material is provided, from which the strip material is uncoiled and fed to the press through a guide roller stand 103 which comprises spaced apart pairs of front and rear support legs 106, with a pair of spaced parallel channel section beams 107 supported between them. At the entrance end of the stand 103, the continuous strip material runs over and is supported on a transversely-extending roller 108, and the strip material 90 then passes between the channel section beams 107, which are arranged with their channels facing one another, and have sets of upwardly-extending rollers 109, supported at the inner faces of the channels 107, which serve to guide the strip material 90 into the press in alignment with the mould channel in the mould plates 56. Sets of transversely-extending guide rollers 110 are also provided on the legs 16 of the frame 10.

Laterally outwardly from the frame 10, there is a windup stand 111 comprising upright support posts 112 which carry a mandrel 113 on which the pressed continuous strip product is wound. The mandrel 113 is driven through a chain drive 114 from a sprocket 116 coupled to an electric motor 117. Preferably, a control is provided for varying the torque of the motor, so that the torque can be adjusted as the diameter of the reel of product increases to maintain the tension in the strip material 90 at a substantially uniform level throughout successive wind-up operations. Preferably, the supply reel of the continuous strip material to be moulded is provided with a brake offering resistance to the unwinding of the supply reel, and maintaining a tension in the strip material so that it tracks accurately along the guide path offered by the various guide rollers 108, 109, 110 and 94 as it passes through the press.

In use, various procedures may be adopted for initially threading the strip material 90 through the press. A length of leader ribbon may be attached to the free end of the strip material on the supply reel, and with the press shoes 61 to 68 in their outer retracted position, and the rollers 94 in the lowered position, the leader ribbon is threaded through the roller stand 103, around the circumference of the drum, and along the path indicated for the strip material 90 in FIG. 2, the leading edge of the ribbon then being attached to the mandrel 113. The drum is then driven from the motor 24 and the windup motor 117 is operated, so that the continuous strip material to be moulded is drawn into the press. Alternatively, a short portion of the leading end of the supply of strip material may be temporarily clamped to the circumference of the drum with a clamp which is later detached, the drum 17 then being rotated to draw the strip material into the press, and to carry the leading edge of the strip material in a circular motion through the press until it reaches a point where it can be withdrawn through the gap between the lower press shoes 61 and 68, the leading edge then being drawn outwardly and eventually being secured to the mandrel 113 of the windup stand 111. As a further alternative, a somewhat longer portion of the leading end of the supply of strip material may be applied to the circumference of the drum, and the press shoes 61 to 68 are then closed so as to press the leading portion of the strip against the drum and mould its inner surface against the mould plate 56 on the drum surface. On opening the press shoes 61 to 68, the interengagement of the moulded strip with the protrusions 59 on the mould plates 56 retains the strip material in engagement with the drum, and the drum is then rotated to draw further strip material into the press, until the leading edge of the strip reaches the gap between the press shoes 61 to 68, whereupon it can be withdrawn from the press and fed to the mandrel 113 of the windup stand 111.

Once the strip material has been threaded through the press, the pressure cylinders 102 are actuated to raise the guide rollers 94 to their upward position, as shown in FIG. 5b, and the rollers 94 are maintained in their raised position throughout their subsequent operation of the press.

During operation, the press shoes 61 to 68 are heated by passing steam through the connections 89, and the drum 17 is heated by passing steam through the inlet passageway 47b. The liquid condensate, which results from loss of heat to the cool strip material, is forced under the pressure of the steam out of the drum through the condensate outlet pipe 48 to the outlet pipe 53.

The press is worked in an interrupted cycle of operations, in which, firstly, the pressure cylinders 71 are actuated in unison to move the press shoes 61 to 68 to their inner, closed position, in which the bight of strip material 90 extending around the circumference of the drum is pressed into the mould channel of the mould plate 56 and has imparted to it the contours of the protrusions 59 constituting the mould surface.

The press shoes 61 to 68 are then retracted to their outer position, and the motor 24 is operated to turn the drum, while at the same time the motor 117 is operated to drive the windup mandrel 113. The interengagement between the moulded surface of the strip material and the protrusions 59 on the mould plate 56 retains the strip material in register with the protrusions 59, and as the drum turns, a fresh length of strip material to be moulded is drawn into the press, while the moulded portion of the strip material is withdrawn towards the windup stand 111. The detector mechanism described above with reference to FIG. 6 is pre-set so that the drum 17 turns through only a limited angle before the microswitch 46 is actuated and the drum driving motor 24 is de-energized, stopping the motion of the drum. This limited angle is selected so that the drum turns to an extent no greater than the circumferential extent of the bight of strip material 90 which is moulded in the press. This ensures that there cannot be inadvertently withdrawn from the press a length of strip material 90 greater than the length which has been moulded, so as to avoid the moulded product having plain, unmoulded discontinuities. As discussed later, in some circumstances it can be advantageous to provide that the drum 17 turns only to an extent which is considerably less than the length of the moulded bight of the strip material 90. The above cycle of operations is then repeated, thus intermittently drawing the strip material through the press, and yielding a moulded continuous strip product.

As can be seen in FIG. 5b, the portions of the strip material 90 which extend between the rollers 94 and the surface of the drum do not lie in conformity with the curvative of the drum. Where the press is employed for moulding heat-hardenable material, such as vulcanizable rubber or curable plastics, the problem may arise that irregular indentations will be pressed into the strip material in these portions which incline away from the drum surface, and there irregular indentations may become permanently set in the strip material. It is therefore desirable to maintain the said portions of the strip material at a somewhat reduced temperature during the pressing operation, so that they are not heated sufficiently to take on a permanent set. This can be achieved by maintaining in the drum 17 a pool of condensate, which is somewhat cooler than the steam, of sufficient depth to cover the interior of the drum adjacent to the above-mentioned portions of the strip material. As mentioned earlier, the depth of the pool of condensate can be controlled by adjustment of the angle of inclination of the condensate outlet pipe 48 to the vertical, through adjustment at the rotary joint 51. The condensate maintains the portion of the drum 17 which is temporarily adjacent the gap between shoes 61 and 68 at a somewhat lower temperature. The depth of condensate pool which is employed is such that the surface level of the pool coincides approximately with the broken radial lines 118 and 119 indicated in FIG. 2. As an additional precaution, it is preferred to supply the small end chambers defined by the partitions 91 and the shoes 61 and 68 with relatively cool fluid, e.g. liquid condensate or air, supplied through the auxiliary connections 92. As a result of these measures, the strip material 90 being supplied to the press will remain unhardened in the portion extending up to, approximately, the line 118 and there will be a semi-hardened portion around the position of the line 118. In the earlier-described cycle of press operation, after the press shoes are opened, the drum 17 is rotated through an angle sufficient to bring the forward edge of the unhardened portion up to approximately the position of the line 119, so that all portions of the strip material under treatment are fully hardened. In the example shown in the drawings, this can be provided for automatically by having the drive ratio between the sprockets 36 and 38 in the detector mechanism shown in FIG. 6 arranged so that the lower sprocket 38, and cam disk 39, turn through 360 degrees when the upper sprocket 36 turns together with the drum 17, through about the major arc defined between the lines 118 and 119, i.e. about 320°. Thus, when the drum is rotated the microswitch 46 of the detector mechanism is actuated after the drum has turned through about 320° stopping the drive motor 24 for the drum 17. Thus, in each cycle of operation of the press, the portion of the strip material initially coinciding with the line 118 will have been semi-hardened, and will be fully hardened in the subsequent cycle of operation, and the moulded product will be fully hardened along its entire length.

Numerous modifications of the press described above with reference to the drawings will suggest themselves to those skilled in the art of press construction. For example, where continuous strip material of sufficient strength is employed, a drive for turning the drum 17 need not be provided, and instead the pull exerted on the continuous strip material by the driven windup 111 may be used to impart a rotary motion to the drum and to draw fresh material to be moulded into the press. Instead of employing smooth-surfaced press plates 74 on the press shoes 61 to 68, these plates 74 may be provided with a contoured profile on their inner surface 76, to impart a moulded surface to the radially outer side of the strip material, as well as on the inner side during the pressing operation.

What I claim as my invention is:

1. A press for moulding strip material, comprising a drum having an exterior circumferential moulding surface on which the strip material is to be applied, the drum moulding surface being formed with a contoured moulding profile for moulding the strip material with corresponding contours when it is pressed onto the drum, a stationary frame extending around the drum moulding surface, means rotatably mounting said drum on said frame for rotation about its axis, a plurality of press shoes being supported on said frame by means whereby they can be extended and retracted radially towards and away from the drum between an outer, inoperative position and an inner, closed position for pressing the strip material into conformity with the drum moulding surface, the shoes in their inner, closed position forming together an inwardly-facing arcuate press surface which extends circumferentially part way around the exterior of the drum and defines a gap between the ends thereof exposing a portion of the drum moulding surface, in which gap portions of continuous strip material to be moulded in the press can be accommodated.

2. A press as claimed in claim 1 including first and second sets of guide and support means which guide continuous strip material toward one edge of said gap and away from the opposite edge of said gap, respectively.

3. A press as claimed in claim 1 wherein the press surface formed by the press shoes extends through a major arc around the drum moulding surface.

4. A press as claimed in claim 1 including support means positioned radially outwardly from said gap for supporting portions of continuous strip material entering and leaving the press.

5. A press as claimed in claim 4 wherein the support means are movable towards and away from the drum moulding surface.

6. A press as claimed in claim 4 wherein the support means comprise a pair of spaced rollers extending parallel to the drum axis.

7. A press as claimed in claim 1 including means whereby the drum may be held in a fixed position.

8. A press as claimed in claim 7 including a drive for the drum comprising a motor coupled to the drum through a worm and cooperating worm gear drive of zero reverse efficiency whereby when the motor is stopped, the drum is held in a fixed stationary position.

9. A press as claimed in claim 7 including a detector mechanism responsive to rotation of the drum and being operated when the drum turns through a predetermined angle to hold the drum in a fixed position.

10. A press as claimed in claim 1 wherein the inner sides of the press shoes at either side of the said gap are bevelled at the edges adjacent the gap.

11. A press as claimed in claim 1 including means for heating the drum and arranged in such manner that the portion of the drum moulding surface which becomes adjacent the said gap attains a lower temperature than the remainder of the drum.

12. A press as claimed in claim 1 including means for heating the press shoes, with the press shoes at either side of the gap being provided with means whereby at least the portions thereof adjacent the gap attain a lower temperature than the other press shoes.

* * * * *